United States Patent [19]

Stevens et al.

[11] Patent Number: 5,645,298
[45] Date of Patent: Jul. 8, 1997

[54] INFLATOR FOR AN INFLATABLE VEHICLE OCCUPANT PROTECTION DEVICE

[75] Inventors: Bruce A. Stevens, Mesa; Michael C. Riley, Gilbert, both of Ariz.

[73] Assignee: TRW Inc./TRW Vehicle Safety Systems, Inc., Lyndhurst, Ohio

[21] Appl. No.: 583,292

[22] Filed: Jan. 5, 1996

[51] Int. Cl.$^6$ ................................................. B60R 21/26
[52] U.S. Cl. ................................................. 280/741; 102/531
[58] Field of Search ....................... 280/741, 736, 280/740, 742, 737; 102/530, 531; 422/164, 165, 166

[56] References Cited

U.S. PATENT DOCUMENTS

| | | | |
|---|---|---|---|
| 2,928,319 | 3/1960 | Sokolowski | 102/530 |
| 4,109,578 | 8/1978 | Goetz | 280/741 |
| 4,600,123 | 7/1986 | Galbraith | 222/3 |
| 4,796,912 | 1/1989 | Lauritzen et al. | 280/736 |
| 4,817,828 | 4/1989 | Goetz | 222/3 |
| 5,131,679 | 7/1992 | Novak et al. | 280/736 |
| 5,241,910 | 9/1993 | Cunningham et al. | 102/530 |
| 5,345,875 | 9/1994 | Anderson | 102/530 |
| 5,507,520 | 4/1996 | Meduvsky et al. | 280/741 |
| 5,529,334 | 6/1996 | Meduvsky et al. | 280/738 |
| 5,531,474 | 7/1996 | Osborne et al. | 280/741 |
| 5,531,475 | 7/1996 | Meduvsky et al. | 280/741 |

OTHER PUBLICATIONS

U.S. Patent Application Serial No. 08/445,652, filed May 22, 1995.

*Primary Examiner*—Brian L. Johnson
*Assistant Examiner*—Peter C. English
*Attorney, Agent, or Firm*—Tarolli, Sundheim, Covell, Tummino & Szabo

[57] ABSTRACT

An inflator (10) includes a housing (12) containing a body (60) of ignitable gas generating material, a body (48) of pyrotechnic material, and an electrically conductive structure (40,44,46) for igniting the body (48) of pyrotechnic material. A closure cap (28) closes the housing (12), and has a passage (190) extending along an axis (18). A tubular structure (220) directs combustion products from the body (48) of pyrotechnic material toward the body (60) of gas generating material, and has an installed position extending axially in the passage (190). The tubular structure (220) and the closure cap (28) have interlocking structures (198,232) for interlocking the tubular structure (220) with the closure cap (28) upon movement of the tubular structure (220) to its installed position in the passage (190).

18 Claims, 11 Drawing Sheets

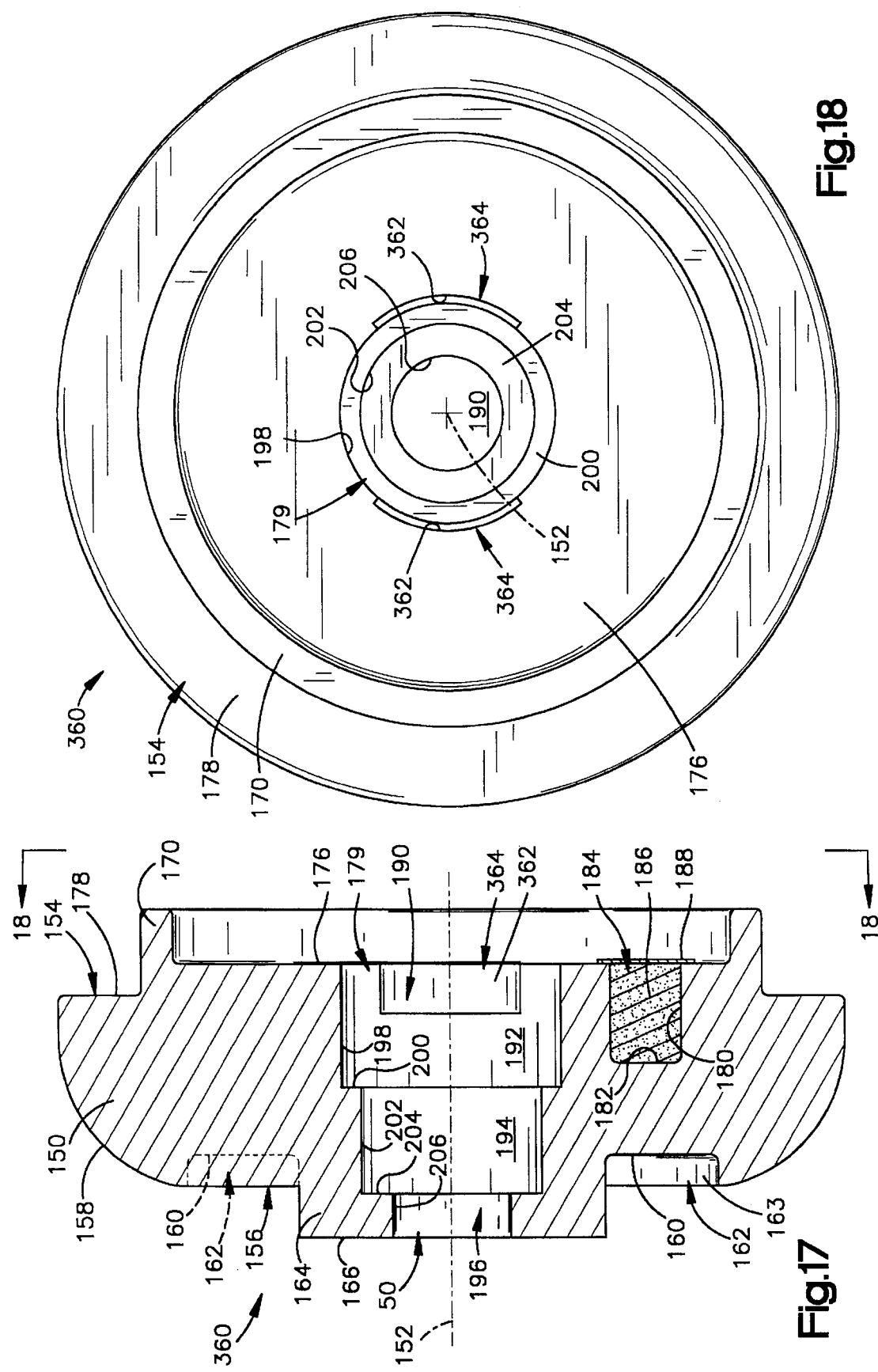

5,645,298

1

INFLATOR FOR AN INFLATABLE VEHICLE OCCUPANT PROTECTION DEVICE

FIELD OF THE INVENTION

The present invention relates to an inflator for an inflatable vehicle occupant protection device such as an air bag.

BACKGROUND OF THE INVENTION

An inflator for inflating a vehicle occupant protection device, such as an air bag, contains a source of inflation fluid for inflating the air bag. In a particular type of inflator, the source of inflation fluid comprises a body of ignitable gas generating material. That type of inflator further includes an igniter. The igniter is actuated so as to ignite the gas generating material when the vehicle experiences a collision for which inflation of the air bag is desired to protect an occupant of the vehicle. As the gas generating material burns, it generates a large volume of inflation gas which is directed to flow from the inflator into the air bag to inflate the air bag. When the air bag is inflated, it extends into the vehicle occupant compartment to help protect an occupant of the vehicle from a forceful impact with parts of the vehicle.

Such an inflator commonly has an elongated cylindrical housing. The housing is closed at one end by an end wall of the housing, and is closed at the other end by a closure cap. A tubular structure is contained in the housing. The tubular structure extends along the length of the housing between the closure cap and the end wall of the housing, and defines an elongated cylindrical combustion chamber in which the body of gas generating material is contained. The tubular structure also defines a filter which surrounds the combustion chamber. The filter cools and filters the gas as the gas flows radially outward through the filter from the combustion chamber toward the housing. A plurality of gas outlet openings extending through the housing direct the gas to flow radially outward from the inflator toward the air bag.

The body of gas generating material has approximately the same size and shape as the cylindrical combustion chamber. Accordingly, the body of gas generating material has an elongated cylindrical shape with longitudinally opposite ends adjacent to the opposite ends of the combustion chamber. Moreover, the elongated body of gas generating material is defined by a plurality of separate, shorter cylindrical grains of gas generating material. The grains of gas generating material are arranged concentrically in a row extending along the length of the combustion chamber.

The igniter is supported by the closure cap adjacent to one end of the combustion chamber. The igniter is thus located adjacent to the first few grains of gas generating material in the row of grains. As a result of this arrangement, ignition of the body of gas generating material begins at the first few grains of gas generating material in the row, and proceeds along the length of the body of gas generating material as all of the grains in the row are ignited successively.

SUMMARY OF THE INVENTION

In accordance with the present invention, an inflator for an inflatable vehicle occupant protection device, such as an air bag, includes a housing containing a body of ignitable gas generating material. The inflator further includes a body of pyrotechnic material for igniting the body of gas generating material, and an electrically conductive means for igniting the body of pyrotechnic material.

A closure means closes the housing. The closure means has a passage extending through the closure means along an axis. A tubular means directs combustion products from the body of pyrotechnic material toward the body of gas generating material. The tubular means has an installed position extending axially in the passage in the closure means. The tubular means and the closure means together comprise locking means for interlocking the tubular means with the closure means so as to block removal of the tubular means from its installed position in the passage. The locking means deflects into a locked condition upon movement of the tubular means to its installed position in the passage.

In a preferred embodiment of the present invention, the closure means has a cylindrical inner surface surrounding a cylindrical outer surface of the tubular means. The locking means comprises a plurality of splines which are compressively loaded radially between those cylindrical surfaces so as to establish an interference fit between the tubular means and the closure means.

In another preferred embodiment of the present invention, the locking means snaps into the locked condition to establish a mechanical interlock between the tubular means and the closure means as a result of movement of the tubular means to its installed position in the passage.

BRIEF DESCRIPTION OF THE DRAWINGS

Further features of the present invention will become apparent to those skilled in the art to which the present invention relates from reading the following description with reference to the accompanying drawings, in which:

FIG. 13 is a schematic view of an electrical circuit including a part of the inflator of FIG. 1;

FIG. 17 is a view of another part of the third embodiment of the present invention;

FIG. 18 is a view taken on line 18—18 of FIG. 17;

DESCRIPTION OF THE PREFERRED EMBODIMENTS

Figure 1:
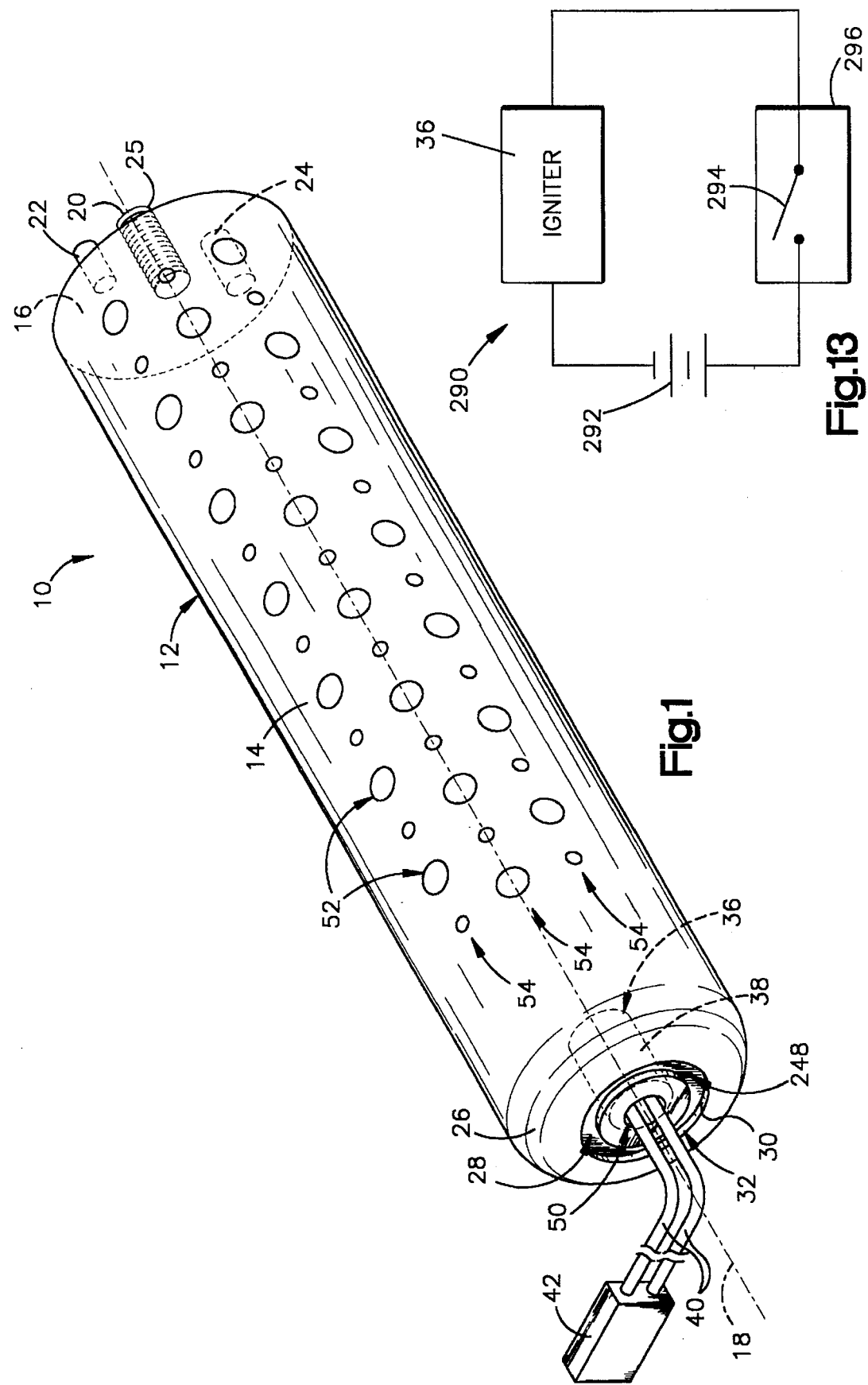
FIG. 1 is a perspective view of an inflator comprising a first embodiment of the present invention.

An inflator 10 comprising a first embodiment of the present invention is shown in FIG. 1. The inflator 10 has a cylindrical housing 12 containing a source of inflation fluid for an inflatable vehicle occupant protection device (not shown) such as an air bag. The source of inflation fluid comprises an ignitable gas generating material. When the inflator 10 is actuated, the gas generating material is ignited. The gas generating material then generates a large volume of gas for inflating the protection device.

The housing 12 has an elongated tubular body wall 14 and a circular end wall 16, each of which is centered on a longitudinal central axis 18. The end wall 16 closes one end of the tubular wall 14, and supports a plurality of mounting studs 20, 22, and 24 for mounting the inflator 10 in a reaction canister (not shown). The reaction canister is a known part which contains and supports the inflator 10 in a vehicle. The first mounting stud 20 is centered on the axis 18, and has a screw thread 25 for receiving a threaded fastener. The second and third mounting studs 22 and 24 are unthreaded, and are sized differently from each other so as to be receivable in respective alignment openings in the reaction canister. This ensures that the inflator 10 will be installed in the reaction canister in a predetermined orientation.

The opposite end of the tubular wall 14 is closed in part by an end portion 26 of the tubular wall 14, and in part by a circular closure cap 28 which is received coaxially within the tubular wall 14. The end portion 26 of the tubular wall 14 has a dome-shaped contour, and extends closely over a dome-shaped portion of the closure cap 28. The end portion 26 of the tubular wall 14 further has an annular edge surface 30 which defines a circular opening 32 centered on the axis 18. An annular elastomeric seal 34 (FIG. 2) is compressively engaged between the closure cap 28 and the end portion 26 of the tubular wall 14. The housing 12 is preferably closed and sealed in this manner in accordance with the invention set forth in copending U.S. patent application Ser. No. 08/327,281, filed Oct. 21, 1994, U.S. Pat. No. 5,531,475 entitled AIR BAG INFLATOR AND METHOD OF ASSEMBLY, and assigned to TRW Vehicle Safety Systems Inc.

Figure 3:
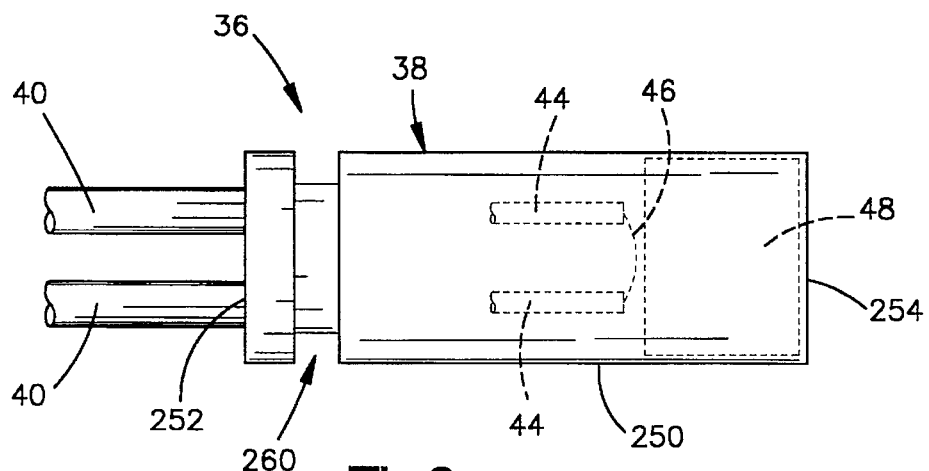
FIG. 3 is a view of a part shown in FIG. 2.

The inflator 10 further includes an electrically actuatable igniter 36 of known construction. As shown in FIG. 1, the igniter 36 comprises a cylindrical casing 38 and a pair of electrical lead wires 40 which extend outward from the casing 38 to an electrical terminal 42. The casing 38 is formed of molded nylon thermoplastic. As shown schematically in FIG. 3, the lead wires 40 have uninsulated inner end portions 44 which are connected to each other by a bridgewire 46. A body 48 of pyrotechnic material is contained in the casing 38. The body 48 of pyrotechnic material is ignited by heat which is generated resistively by the bridgewire 46 upon the passage of electric current through the igniter 36 between the lead wires 40. When the body 48 of pyrotechnic material is ignited, it produces combustion products which emerge rapidly from the casing 38. The pyrotechnic material of which the body 48 is formed may have any suitable composition known in the art.

As further shown in FIG. 1, the igniter 36 is supported by the closure cap 28. The casing 38 is located coaxially within the tubular wall 14, with the lead wires 40 extending outward from the casing 38 through a circular opening 50 at the center of the closure cap 28, and further outward through the opening 32 in the tubular wall 14. The casing 38 is thus supported in a position from which it directs the combustion products from the body 48 of pyrotechnic material into contact with the gas generating material in the housing 12 so as to ignite the gas generating material upon actuation of the igniter 36.

When the gas generating material in the housing 12 is ignited, it rapidly generates a large volume of inflation gas which emerges from the housing 12 through a plurality of outlet openings 52 in the tubular wall 14. The gas is directed from the inflator 10 to the inflatable device by the reaction canister and/or by a diffuser or manifold structure (not shown), as known in the art.

The outlet openings 52 are closely spaced from each other in parallel rows 54 which extend axially along nearly the entire length of the tubular wall 14. The rows 54 of outlet openings 52 are, in turn, closely spaced from each other in an array extending partially around the circumference of the tubular wall 14. The tubular wall 14 has a similar array of additional outlet openings (not shown) at a location diametrically opposite the location of the array of openings 52. The additional openings are not intended to direct gas toward the inflatable device, but instead are intended to vent gas away from the inflatable device if the pressure of the gas exceeds a predetermined elevated level. Such additional openings are known in the art, and preferably have a total flow area substantially less than the total flow area of the openings 52.

Figure 2:
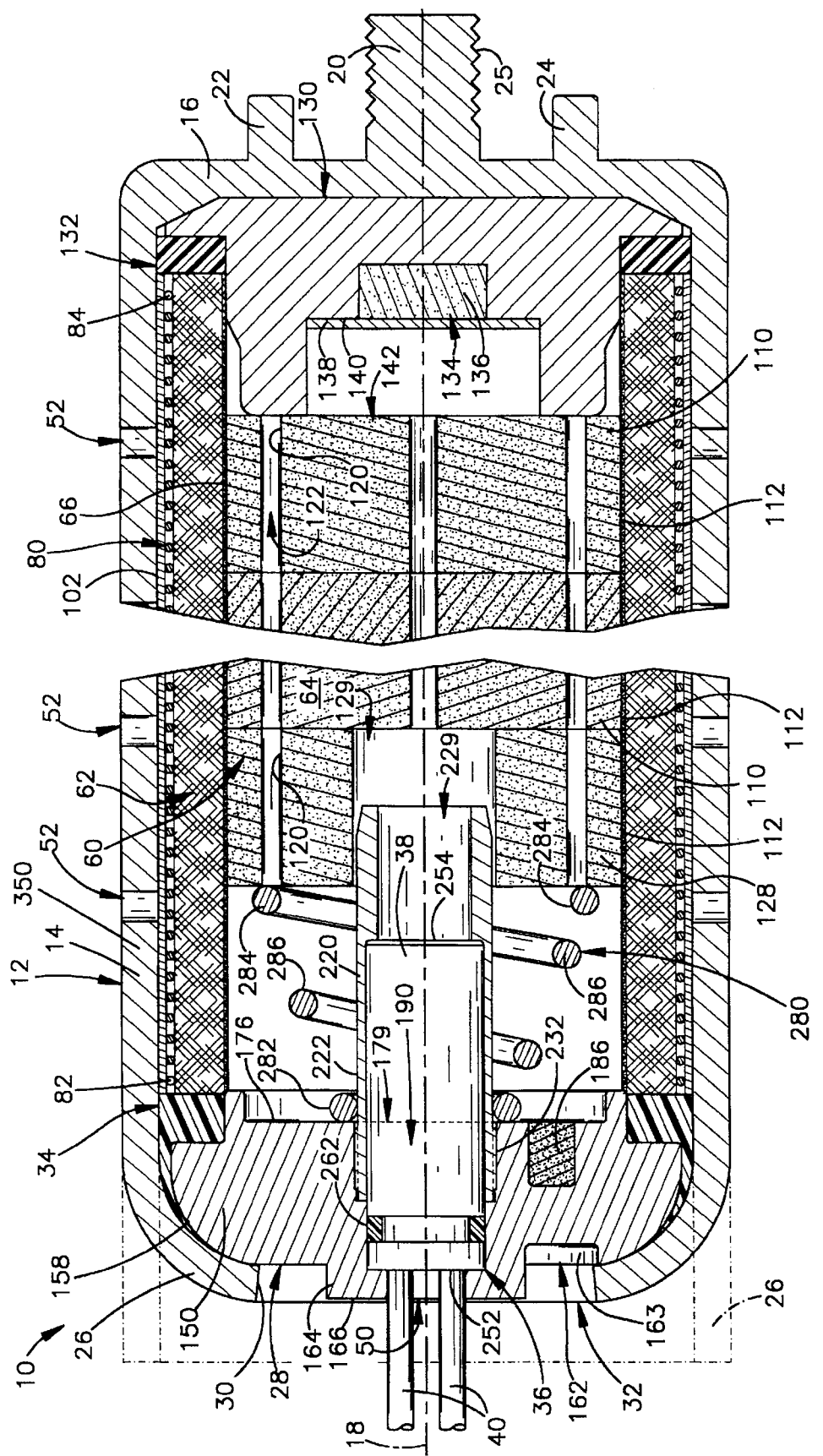
FIG. 2 is a side view, partly in section, of the inflator of FIG. 1.

As shown partially in FIG. 2, the gas generating material in the housing 12 takes the shape of an elongated cylindrical body 60. The housing 12 also contains an elongated tubular structure 62. The tubular structure 62 defines a cylindrical combustion chamber 64 in which the elongated cylindrical body 60 of gas generating material is contained.

Figure 4:
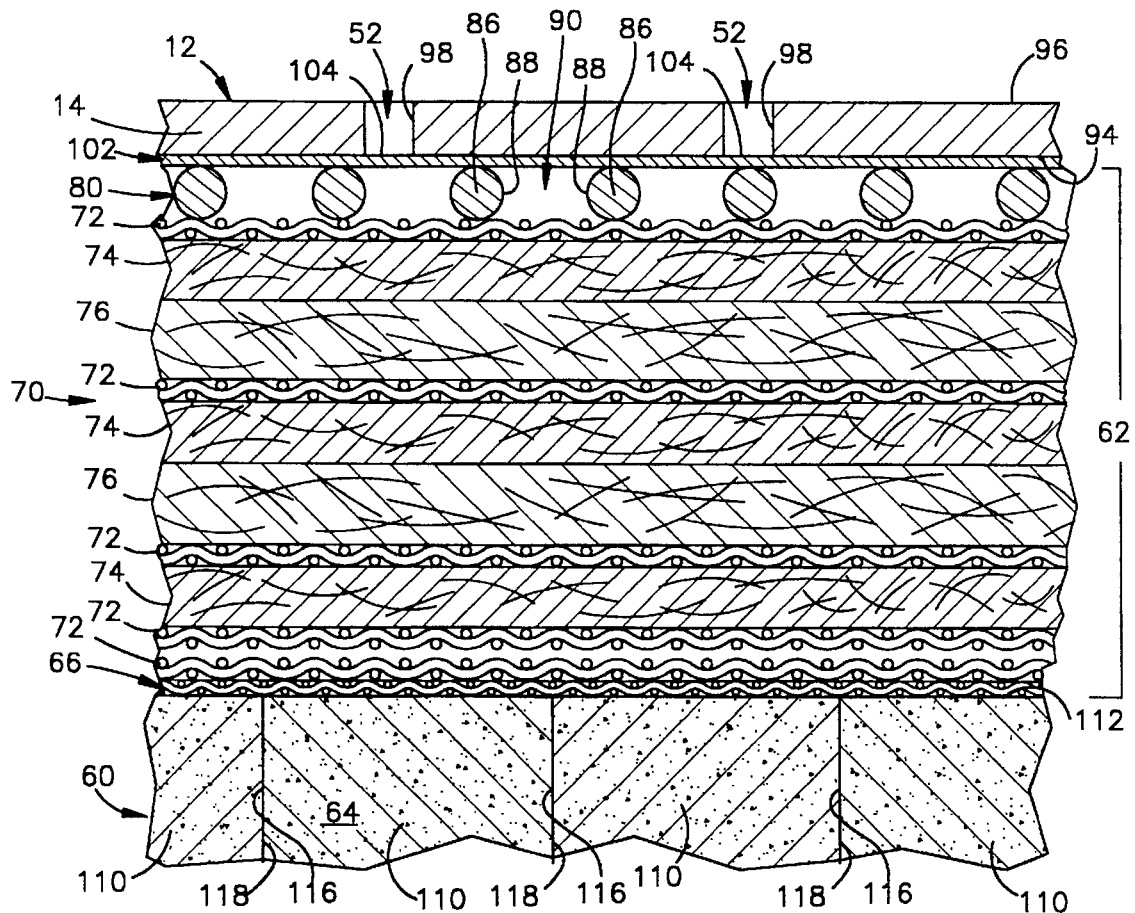
FIG. 4 is an enlarged partial view of parts shown in FIG. 2.

As shown in enlarged detail in FIG. 4, the combustion chamber 64 is defined by a cylindrical wire mesh screen 66 which defines the inner diameter of the tubular structure 62. Alternatively, the combustion chamber 64 could be defined by a perforated tubular inner body wall. Such an inner body wall could be constructed as known in the art, or as shown in copending U.S. patent application Ser. No. 08/445,652, filed May 22, 1995, entitled AIR BAG INFLATOR, and also assigned to TRW Vehicle Safety Systems Inc.

A generally cylindrical filter 70 extends circumferentially around the screen 66. The filter 70 preferably has a plurality of generally cylindrical filter layers, including layers 72 of wire mesh screen, layers 74 of steel wool, and layers 76 of ceramic/glass wool, as shown in FIG. 4. The filter 70 also could have an alternative structure as known in the art, or as shown in said copending U.S. patent application Ser. No. 08/445,652.

The tubular structure 62 further includes a support member 80. The support member 80 is a strand of metal wire which extends circumferentially and axially over the filter 70. More specifically, the support member 80 has opposite ends 82 and 84 (FIG. 2), which are fixed to the filter 70 by welds (not shown), and extends over the filter 70 in a helical configuration. A plurality of successive sections 86 (FIG. 4) of the support member 80 are shaped as helical turns extending over the filter 70 circumferentially entirely around the axis 18. The helical sections 86 have opposed helical surface portions 88 which are spaced from each other axially to define a gap 90. The gap 90 likewise extends over the filter 70 circumferentially entirely around the axis 18 in a plurality of helical turns, and is open and free of obstructions axially across its width and circumferentially along its entire length. The width of the gap 90 can be varied. However, the width of the gap 90 is preferred to be substantially greater than the widths of the openings in the underlying layers 72 of wire mesh screen in the filter 70.

The tubular wall 14 of the housing 12 has a cylindrical inner side surface 94, a cylindrical outer side surface 96, and a plurality of cylindrical inner edge surfaces 98 which define the outlet openings 52. A sheet 102 of rupturable pressure controlling material, which is preferably formed of aluminum foil, extends circumferentially around the inner side surface 94 of the tubular wall 14 in continuous contact with the inner side surface 94. The sheet 102 has a plurality of individual circular portions 104, each of which extends across the inner end of a respective one of the gas outlet openings 52.

The sheet 102 of rupturable pressure controlling material is preferably adhered to the inner side surface 94 of the tubular wall 14 of the housing 12 before the tubular structure 62 is installed in the housing 12. The tubular structure 62, which includes the filter 70, is then moved longitudinally into the housing 12 through the open end of the tubular wall 14. When the tubular structure 62 is moved into the housing 12, the support member 80 slides against the sheet 102 of rupturable pressure controlling material in helical line contact. The line contact helps prevent the outermost layer 72 of wire mesh screen in the filter 70 from tearing the sheet 102.

The elongated body 60 of gas generating material includes a plurality of separate, coaxial cylindrical bodies of gas generating material which are known as grains. The gas generating material of which the grains are formed is an ignitable material which rapidly generates a large volume of inflation gas when ignited, and may have any suitable composition known in the art.

Figure 6:
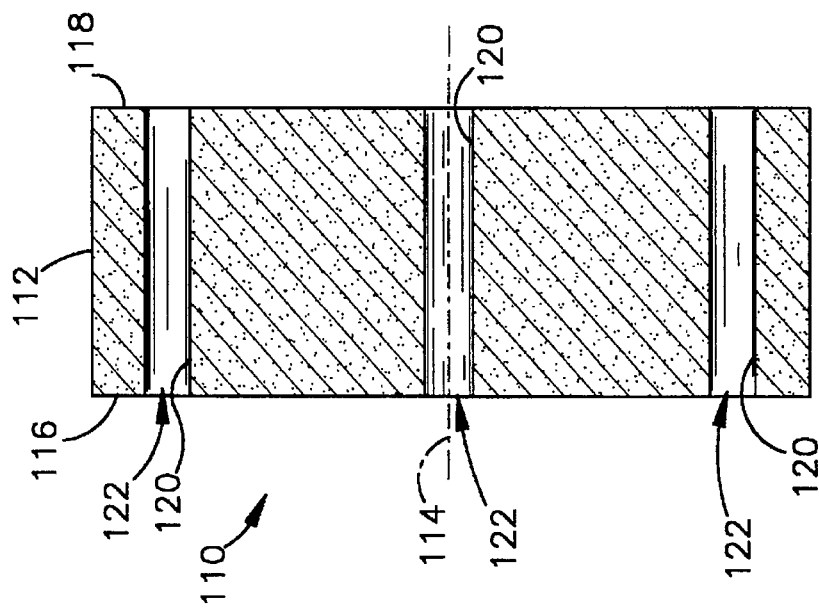
FIG. 6 is a view taken on line 6—6 of FIG. 5.
Figure 5:
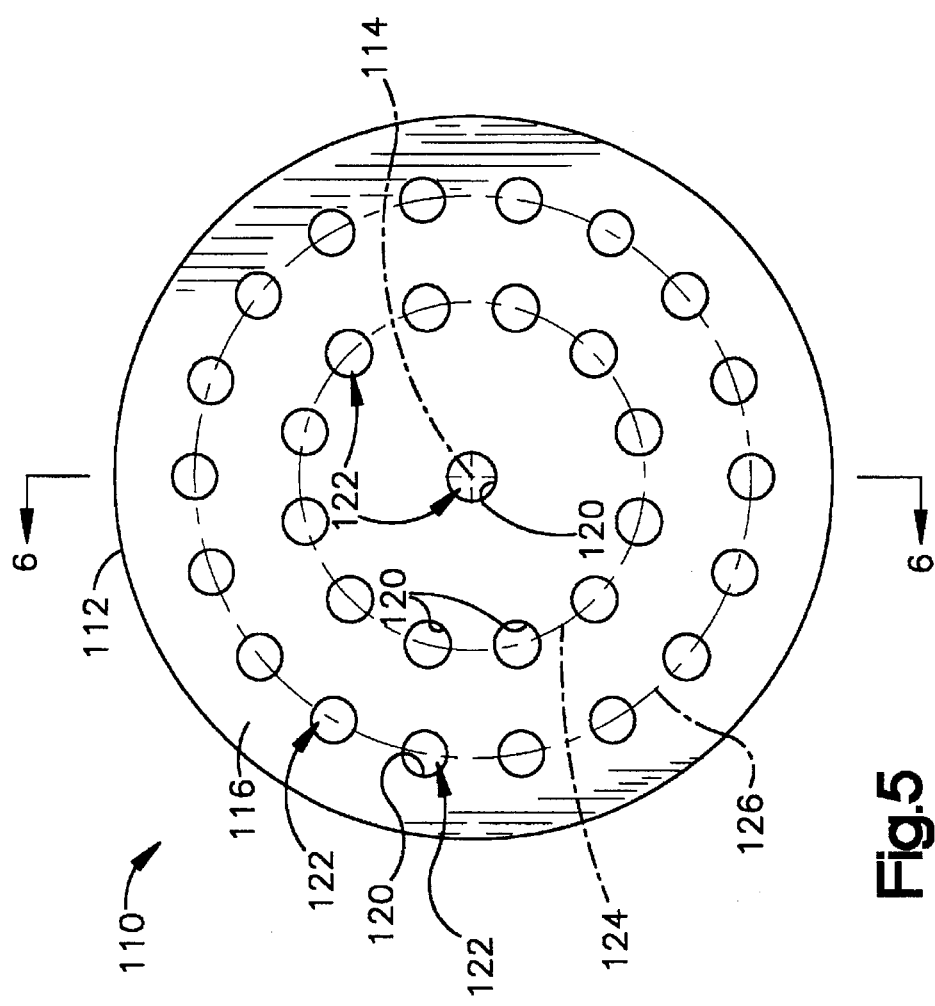
FIG. 5 is an enlarged view of a part shown in FIG. 2.

As an example of the different grains of gas generating material that may be used in the inflator 10, the configuration of a typical grain 110 is shown in detail in FIGS. 5 and 6. The grain 110 has a cylindrical outer surface 112 centered on an axis 114. The grain 110 further has first and second opposite side surfaces 116 and 118. Each of the opposite side surfaces 116 and 118 has a circular shape centered on the axis 114, and is generally perpendicular to the axis 114.

The grain 110 preferably has a plurality of cylindrical inner surfaces 120, each of which defines a respective cylindrical passage 122 extending axially through the grain 110. The number and arrangement of the cylindrical inner surfaces 120 may vary. As shown by way of example in FIGS. 5 and 6, one of the cylindrical inner surfaces 120 is centered on the axis 114, and the other cylindrical inner surfaces 120 are arranged in first and second circular arrays. The first circular array of cylindrical inner surfaces 120 extends circumferentially around the axis 114 on a first circular line 124. The first circular line 124 is centered on the axis 114. The second circular array of cylindrical inner surfaces 120 extends circumferentially around the axis 114 on a second circular line 126. The second circular line 126 also is centered on the axis 114, and is spaced radially outward from the first circular line 124. Moreover, each of the cylindrical inner surfaces 120 in the second circular array is at least partially offset circumferentially from each of the cylindrical inner surfaces 120 in the first circular array.

The body 60 of gas generating material further includes at least one atypical grain 128 (FIG. 2) of gas generating material. The atypical grain 128 differs from the typical grains 110 in that the atypical grain 128 has a substantially larger central passage 129, but is otherwise substantially the same as each of the typical grains 110.

Each of the grains 110 and 128 of gas generating material preferably has an ignition-enhancing coating formed of a pyrotechnic material. The pyrotechnic material of which the coatings are formed does not generate a significant amount of gas, but is more readily ignitable than the gas generating material of which the grains 110 and 128 are formed. The pyrotechnic material may have any suitable composition known in the art. Alternatively, the grains 110 and 128 of gas generating material could be free of such coatings.

A short, generally cylindrical spacer 130 (FIG. 2) is contained in the housing 12 at the axially inner end of the combustion chamber 64. The spacer 130 is seated closely against the end wall 16 of the housing 12, and spaces the body 60 of gas generating material axially from the end wall 16. The spacer 130 is preferably constructed in accordance with the invention set forth in copending U.S. patent application Ser. No. 08/358,788, filed Dec. 16, 1994, U.S. Pat. No. 5,507,520 entitled AIR BAG INFLATOR AND METHOD OF ASSEMBLY, and assigned to TRW Vehicle Safety Systems Inc. As described in that copending application, an annular elastomeric seal 132 is stretched circumferentially and radially over the spacer 130. The seal 132 is compressively loaded between the surrounding surfaces of the adjoining parts of the inflator 10. As a result, the seal 132 fills the space through which a flow of gas from the combustion chamber 64 might otherwise leak past the filter 70 at the axially inner end of the housing 12.

A compartment 134 at the center of the spacer 130 contains a body 136 of auto-ignition material. The body 136 of auto-ignition material is held in the compartment 134 by a sheet 138 of metal foil or the like which is adhered to an inner surface 140 of the spacer 130. The auto-ignition material ignites and emits combustion products automatically when its temperature reaches a predetermined elevated level, and may have any suitable composition known in the art. The combustion products emitted from the body 136 of auto-ignition material rupture the sealing sheet 138 and move against the adjacent grain 110 of gas generating material in the combustion chamber 64. In this manner, the body 60 of gas generating material is ignited automatically when ambient conditions cause the temperature of the inflator 10 to reach the predetermined elevated level.

Although the preferred embodiments of the present invention include the spacer 130 and the seal 132, the axially inner end of the housing 12 could be sealed by an alternative structure, such as the structure disclosed in copending U.S. patent application Ser. No. 08/436,588, filed May 8, 1995, U.S. Pat. No. 5,529,334 entitled AIR BAG INFLATOR AND METHOD OF ASSEMBLY, and assigned to TRW Vehicle Safety Systems Inc.

The closure cap 28 is formed of die cast aluminum, but may be formed of steel or any other suitable material known in the art. As shown separately in FIG. 7, the closure cap 28 has a body portion 150 centered on an axis 152. The body portion 150 of the closure cap 28 has axially inner and outer sides 154 and 156. A circumferentially extending peripheral surface 158 of the body portion 150 has an arcuate radial profile extending axially outward, and radially inward, from the inner side 154 to the outer side 156. The peripheral surface 158 thus has the contour of a dome which is centered on the axis 152.

The closure cap 28 has a plurality of recessed surfaces 160 at the outer side 156 of the body portion 150. The recessed surfaces 160 define a corresponding plurality of mass reduction cavities 162. The mass reduction cavities 162 are arranged in a circular array centered on the axis 152, and are spaced circumferentially from each other by a corresponding plurality of ribs 163. Since the closure cap 28 is formed of die cast material, the mass reduction cavities 162 and the ribs 163 are provided to enhance the structural integrity of the body portion 150 of the closure cap 28. Any suitable alternative arrangement of such cavities and ribs could also be used.

A first cylindrical portion 164 of the closure cap 28 projects a short distance axially away from the outer side 156 of the body portion 150. An annular outer end surface 166 of the first cylindrical portion 164 defines the circular central opening 50 which is described above with reference to FIG. 1. A second cylindrical portion 170 of the closure cap 28 projects a short distance axially away from the inner side 154 of the body portion 150, and is spaced radially outward from the first cylindrical portion 164.

The inner side 154 of the closure cap 28 includes first and second planar inner side surfaces 176 and 178, each of which lies in a respective plane perpendicular to the axis 152. The first inner side surface 176 has an annular shape, and extends radially inward from the second cylindrical portion 170 to a circular opening 179 centered on the axis 152. The second inner side surface 178 also has an annular shape, and extends radially outward from the second cylindrical portion 170 to the peripheral surface 158.

The closure cap 28 preferably has additional inner side surfaces 180 and 182 which together define a generally cylindrical compartment 184 containing a body 186 of auto-ignition material. Like the body 136 of auto-ignition material described above, the body 186 may be formed of any suitable auto-ignition material which ignites and emits combustion products automatically at a predetermined elevated temperature. The compartment 184 containing the body 186 of auto-ignition material is preferably sealed hermetically by a rupturable piece 188 of metal foil or the like which is adhered to the first planar inner side surface 176.

A passage 190 extends through the closure cap 28 between the openings 50 and 179. The passage 190 has three successive sections 192, 194, and 196, each of which has a cylindrical shape centered on the axis 152. The first section 192 of the passage 190 extends axially from the opening 179 to the second section 194. The length and diameter of the first section 192 are defined by a first cylindrical inner surface 198 of the body portion 150 of the closure cap 28. An end of the first section 192 is defined by a first annular inner surface 200 which extends radially inward from the first cylindrical inner surface 198.

The second section 194 of the passage 190 extends axially from the first section 192 to the third section 196. A second cylindrical inner surface 202 defines a shorter length, and a lesser diameter, for the second section 194, as compared to the first section 192. A second annular inner surface 204 extends radially inward from the second cylindrical inner surface 202, and defines an end of the second section 194 of the passage 190. The third section 196 of the passage 190 extends axially from the second section 194 to the opening 50. A third cylindrical inner surface 206 provides the third section 196 with the shortest length, and the smallest diameter, of the three sections 192, 194, and 196 of the passage 190.

As described briefly above with reference to FIG. 1, the closure cap 28 supports the igniter 36 on the axis 18 of the housing 12. As shown in greater detail in FIG. 2, the closure cap 28 also supports a retainer tube 220 in which the igniter casing 38 extends along the axis 18.

Figure 8:
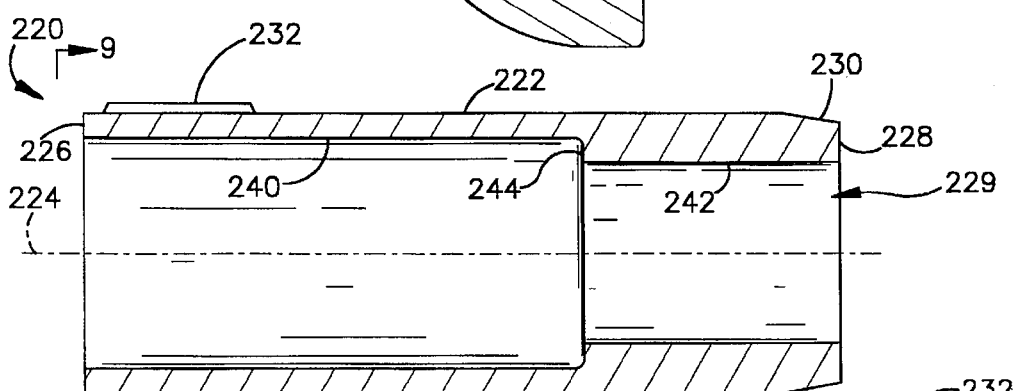
FIG. 8 is an enlarged view of another part shown in FIG. 2.
Figure 9:
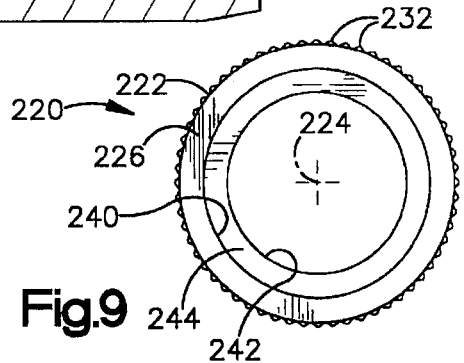
FIG. 9 is a view taken on line 9—9 of FIG. 8.

Like the closure cap 28, the retainer tube 220 is preferably formed of aluminum or steel. As shown separately in FIGS. 8 and 9, the retainer tube 220 has a cylindrical outer surface 222 centered on a longitudinal central axis 224. The retainer tube 220 further has first and second opposite end surfaces 226 and 228 with annular shapes centered on the axis 224. The second end surface 228 defines a circular opening 229. A chamfered edge surface 230 extends circumferentially around the axis 224 adjacent to the second end surface 228. A plurality of splines 232 are located near the first end surface 226. The splines 232 project radially outward from the cylindrical outer surface 222, and are elongated in directions parallel to the axis 224. The splines 232 all have the same size and shape, and are equally spaced a short distance from the first end surface 226. The number of the splines 232 may vary. However, as shown in FIG. 9, the splines 232 are preferably provided in a sufficient number so as to be closely spaced from each other in an array extending circumferentially entirely around the axis 224.

Figure 7:
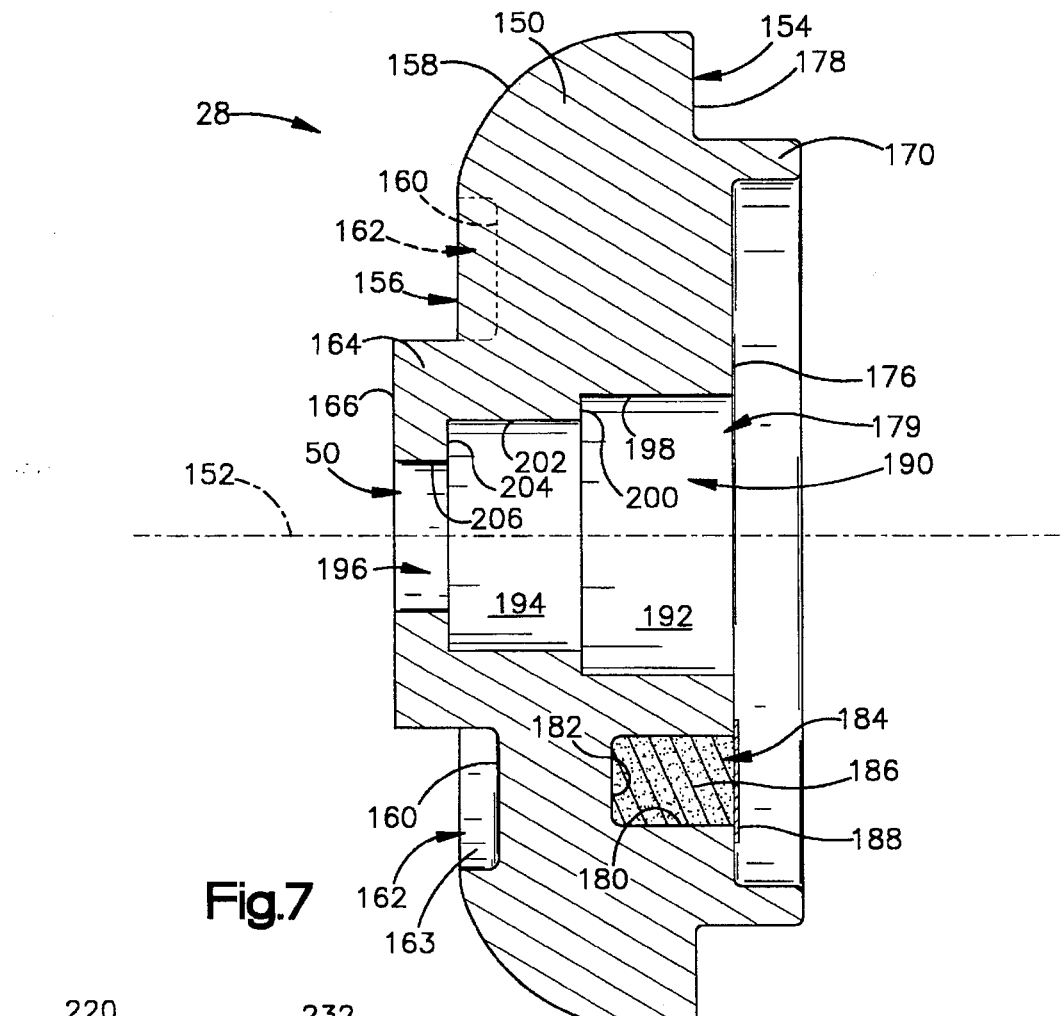
FIG. 7 is an enlarged view of a part shown in FIG. 2.

The retainer tube 220 further has first and second cylindrical inner surfaces 240 and 242 centered on the axis 224. The first cylindrical inner surface 240 has a diameter which is substantially equal to the diameter of the second cylindrical inner surface 202 of the closure cap 28 (FIG. 7). An annular inner surface 244 of the retainer tube 220 extends radially inward from the first cylindrical inner surface 240 to the smaller diameter second cylindrical inner surface 242.

Figure 10:
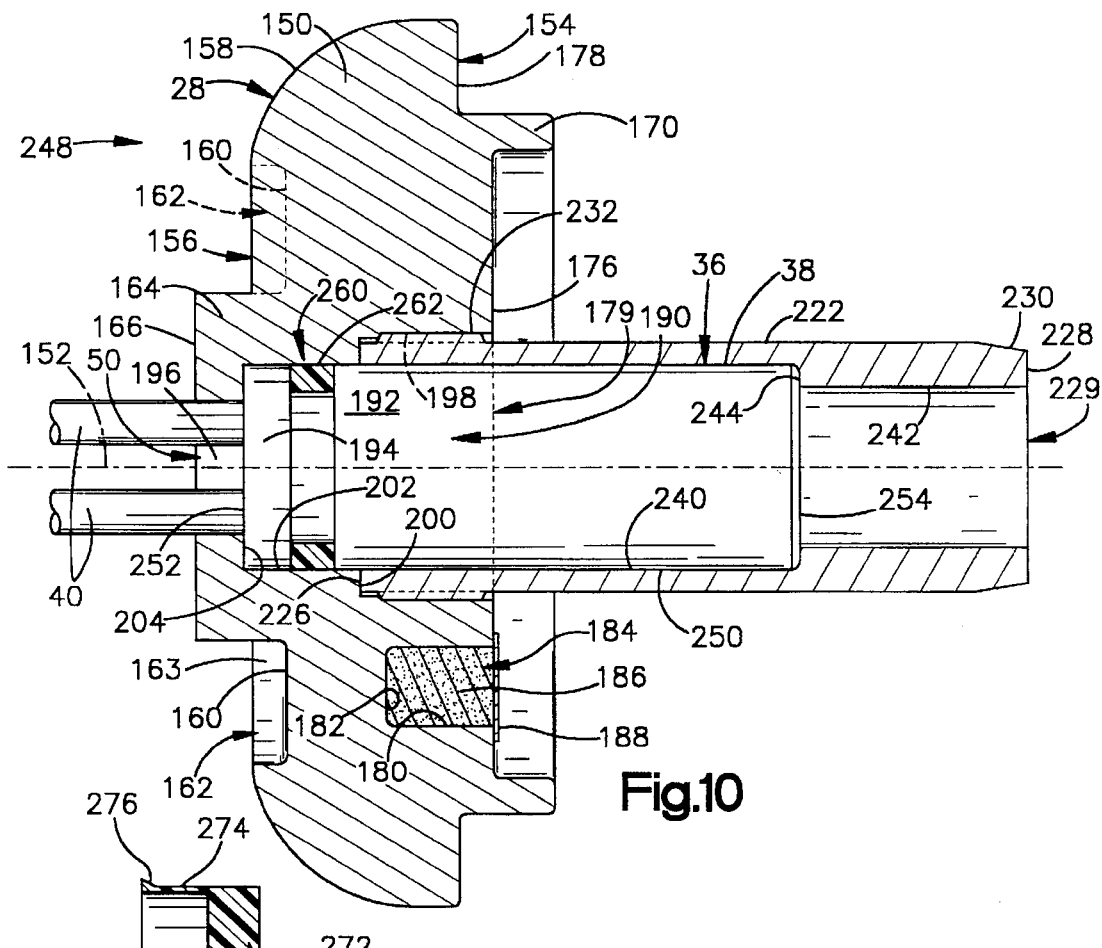
FIG. 10 is an enlarged view of a subassembly of parts shown in FIG. 2.

The closure cap 28, the retainer tube 220, and the igniter 36 are shown in FIG. 10 in an interlocked relationship with each other. When those parts of the inflator 10 are in the interlocked relationship of FIG. 10, they define a subassembly 248.

In the subassembly 248, the igniter casing 38 and the retainer tube 220 are installed coaxially within the passage 190 in the closure cap 28. The casing 38 has a tubular body wall 250 with a closed end 252 and an open end 254. The casing 38 is inserted in the passage 190 through the opening 179 (FIG. 7), and is moved axially through the passage 190 until the closed end 252 of the casing 38 abuts the second annular inner surface 204 of the closure cap 28. The diameter of the body wall 250 of the casing 38 is equal to, or just slightly less than, the diameter of the second cylindrical inner surface 202 of the closure cap 28. Therefore, the casing 38 fits closely within the second section 194 of the passage 190, and projects axially away from the second section 194 through the first section 192 and the opening 179. The lead wires 40 project axially away from the casing 38 in the opposite direction through the third section 196 of the passage 190, and extend outward through the other opening 50. A notch 260 extending circumferentially around the casing 38 contains an elastomeric O-ring seal 262 which is compressively loaded radially between the casing 38 and the second cylindrical inner surface 202 of the closure cap 28.

When the igniter 36 has been moved into the passage 190 in the closure cap 28 in the foregoing manner, the retainer tube 220 is moved into the passage 190 coaxially over the casing 38. As shown in FIG. 10, the inner diameter of the retainer tube 220 at the first cylindrical inner surface 240 is equal to, or just slightly greater than, the outer diameter of the casing 38 at the body wall 250. Therefore, the retainer tube 220 slides closely over the casing 38 as the retainer tube 220 is being moved into the passage 190 through the opening 179. The retainer tube 220 is movable into the passage 190 in this manner until the first annular end surface 226 of the retainer tube 220 abuts the first annular inner surface 200 of the closure cap 28. Preferably, the annular surface 244 inside the retainer tube 220 simultaneously abuts the second end wall 254 of the casing 38, but a small space may remain axially between those surfaces. The casing 38 is thus retained axially between the annular inner surface 244 of the retainer tube 220 and the oppositely facing, second annular inner surface 204 of the closure cap 28.

Importantly, the outer diameter of the retainer tube 220 at the cylindrical outer surface 222 is slightly less than the inner diameter of the closure cap 28 at the first cylindrical inner surface 198. Also, the outer diameter of the retainer tube 220 defined by the splines 232 is slightly greater than the inner diameter of the closure cap 28 at the first cylindrical inner surface 198. In accordance with this feature of the present invention, the splines 232 are moved forcefully against the first cylindrical inner surface 198 of the closure cap 28 upon movement of the retainer tube 220 axially into the passage 190. Such forceful movement of the splines 232 against the first cylindrical inner surface 198 causes the splines 232 and/or the closure cap 28 to be forcefully deflected. Preferably, the splines 232 cut into the material of the closure cap 28 so as to penetrate and compressively deform the material of the closure cap 28 radially outward of the first cylindrical inner surface 198. The resistance offered by the material of the closure cap 28 simultaneously causes the splines 232 to become compressively loaded radially, and may cause the splines 232 to become compressively deformed radially inward toward the cylindrical outer surface 222 of the retainer tube 220. The amounts of cutting, penetration, and compression of the materials of the closure cap 28 and the splines 232 depends on the hardness of those materials, with the harder material yielding in a correspondingly lesser amount. An interference fit is thus established which securely interlocks the retainer tube 220 with the closure cap 28 so as to block removal of the retainer tube 220 from its installed position in the passage 190. The retainer tube 220, in turn, blocks removal of the igniter 36 from its installed position in the passage 190.

The subassembly 248 of FIG. 10 is closely received coaxially within the tubular wall 14 of the housing 12 (FIG. 2). As indicated in dot-dash lines in FIG. 2, the end portion 26 of the tubular wall 14 is initially cylindrical. When the closure cap 28 has been moved into the housing 12, the end portion 26 of the tubular wall 14 is deformed radially and axially inward over the closure cap 28. This process provides the end portion 26 of the tubular wall 14 with a dome-shaped contour closely matching that of the peripheral surface 158 of the closure cap 28 so that the end portion 26 closely overlies the peripheral surface 158. Preferably, the end portion 26 overlies the peripheral surface 158 in contact with a substantial area of the peripheral surface 158, and most preferably with an area that extends circumferentially entirely around the axis 18. Such deformation of the tubular wall 14 can be accomplished with any suitable technique known in the art, but is preferably accomplished in the manner described in the aforementioned copending U.S. patent application Ser. No. 08/327,281.

Figure 11:
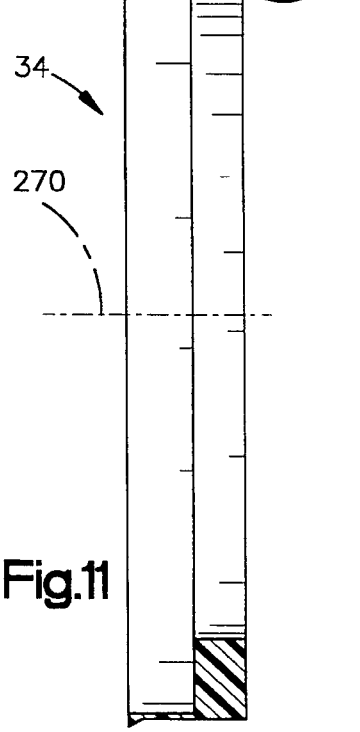
FIG. 11 is an enlarged view of another part shown in FIG. 2.

As described briefly above with reference to FIG. 2, the seal 34 is compressively engaged between the closure cap 28 and the end portion 26 of the tubular wall 14. As shown separately in FIG. 11, the seal 34 has a central axis 270, a body portion 272 with a rectangular cross section, and a lip portion 274 projecting axially from the body portion 272. The lip portion 274 of the seal 34 has a narrow radial thickness, as compared with the body portion 272, and includes a small flange 276 projecting radially outward at its free end.

The body portion 272 of the seal 34 is received coaxially over the second cylindrical portion 170 of the closure cap 28 (FIG. 2), and extends radially outward to the tubular wall 14 of the housing 12. The body portion 272 of the seal 34 further extends axially inward from the inner side surface 178 of the closure cap 28 to the tubular structure 62. The lip portion 274 of the seal 34 extends axially and radially between the dome-shaped peripheral surface 158 of the closure cap 28 and the overlying, dome-shaped end portion 26 of the tubular wall 14. When the end portion 26 of the tubular wall 14 is deformed radially and axially inward as described above, the body portion 272 and the lip portion 274 of the seal 34 are both compressively loaded between the surrounding surfaces of the adjoining parts of the inflator 10. As a result, the seal 34 fills the space through which gas might otherwise escape from the combustion chamber 64 and leak outward through the opening 50 in the closure cap 28.

A spring 280 also is contained in the housing 12, and is located axially between the closure cap 28 and the first grain 128 of gas generating material adjacent to the closure cap 28. The spring 280 in the preferred embodiments of the present invention is a coil spring formed of steel wire.

Figure 12:
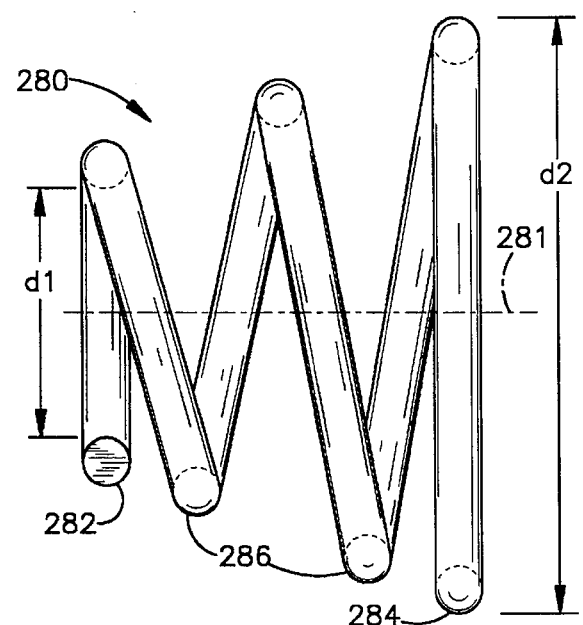
FIG. 12 is an enlarged view of still another part shown in FIG. 2.

As shown separately in FIG. 12, the spring 280 has a central axis 281, first and second circular coils 282 and 284 at its axially opposite ends, and a plurality of helical coils 286 extending along its length between the circular coils 282 and 284. When the spring 280 is in the unstressed condition of FIG. 12, the first circular coil 282 defines an inner diameter d1 of the spring 280. The inner diameter d1 is slightly less than the outer diameter of the retainer tube 220 (FIG. 10) at the cylindrical outer surface 222 of the retainer tube 220. The second circular coil 284 defines an outer diameter d2 of the spring 280. The outer diameter d2 is slightly less than the outer diameter of the first grain 128 (FIG. 2) of gas generating material.

As shown in FIG. 2, the first circular coil 282 of the spring 280 is received closely over the cylindrical outer surface 222 of the retainer tube 220. Since the unstressed inner diameter d1 (FIG. 12) of the first circular coil 282 is less than the diameter of the cylindrical outer surface 222, the first circular coil 282 is stressed and extended radially when it is being moved axially onto the cylindrical outer surface 222. The chamfered edge surface 230 of the retainer tube 220 helps to extend the first circular coil 282 to the diameter of the cylindrical outer surface 222. As a result, the first circular coil 282 exerts a spring force radially inward against the cylindrical outer surface 222 to establish a tight fit which holds the spring 280 securely on the retainer tube 220. The spring 280 is connected with the subassembly 248 (FIG. 10) in this manner before the subassembly 248 is placed within the tubular wall 14 of the housing 12.

When the tubular wall 14 is deformed axially and radially inward against the closure cap 28, as described above, the first circular coil 282 on the spring 280 is pressed axially against the first inner side surface 176 of the closure cap 28. The second circular coil 284 on the spring 280 is pressed axially against the first grain 128 of gas generating material.

The spring 280 is thus compressed axially between the closure cap 28 and the body 60 of gas generating material so as to exert a bias which urges the body 60 axially against the spacer 130, and which holds the separate grains 128 and 110 together firmly enough to keep them from moving within the housing 12.

The igniter 36 is included in an electrical circuit 290, as shown schematically in FIG. 13, when the inflator 10 is installed in a vehicle. The electrical circuit 290 further includes a power source 292, which is preferably the vehicle battery and/or a capacitor, and a normally open switch 294. As known in the art, the switch 294 is part of a sensor 296 which senses a vehicle condition indicating the occurrence of a vehicle collision. The collision-indicating condition may comprise, for example, sudden vehicle deceleration that is caused by a collision. If the collision-indicating condition is at or above a predetermined threshold level, it indicates the occurrence of a collision having at least a threshold level of severity for which inflation of the inflatable device is desired for protection of a vehicle occupant. The switch 294 closes when the sensor 296 senses such a collision-indicating condition.

When the switch 294 in the circuit 290 is closed, electric current is directed through the igniter 36 between the lead wires 40 (FIG. 2). The body 48 of pyrotechnic material in the casing 38 is then ignited and, as described above, generates combustion products which are spewed into the housing 12 to ignite the body 60 of gas generating material in the housing 12. Specifically, the combustion products move outward through the open end 254 of the casing 38 and further outward through the retainer tube 220 from the casing 38 to the opening 229. The combustion products emerging from the opening 229 move against the first grains 128 and 110 of gas generating material adjacent to the subassembly 248 to ignite the first grains 128 and 110.

When the first grains 128 and 110 of gas generating material are ignited, they rapidly generate a large volume of inflation gas. They also produce and emit additional combustion products including heat and hot particles. Some of those combustion products move into contact with the next adjacent grain 110 of gas generating material. As a result, the next adjacent grain 110 of gas generating material also is ignited and, in turn, emits additional combustion products. This process continues along the length of the elongated body 60 of gas generating material as all of the grains 110 are ignited successively. The ignitable surface areas provided by the cylindrical inner surfaces 120, and the fluid communication provided by the passages 122, promote rapid ignition of the grains 110 in this manner.

The combustion chamber 64 is fully closed and sealed at its axially opposite ends by the closure cap 28, the spacer 130, and the elastomeric seals 34, 262, and 132. This constrains the gas to flow outward from the combustion chamber 64 only through the cylindrical screen 66 (FIG. 2). The gas subsequently flows radially outward through the filter 70. When the filtered gas emerges from the outermost filter layer 72, it continues to flow radially outward toward the tubular housing wall 14 through the gap 90 defined by the support member 80. The sheet 102 of rupturable pressure controlling material initially contains the gas within the housing 12. When the pressure of the gas acting radially outward against the sheet 102 reaches a predetermined elevated level, it ruptures the circular portions 104 of the sheet 102 which extend across the inner ends of the outlet openings 52. The gas then emerges from the inflator 10 through the outlet openings 52.

Figure 14:
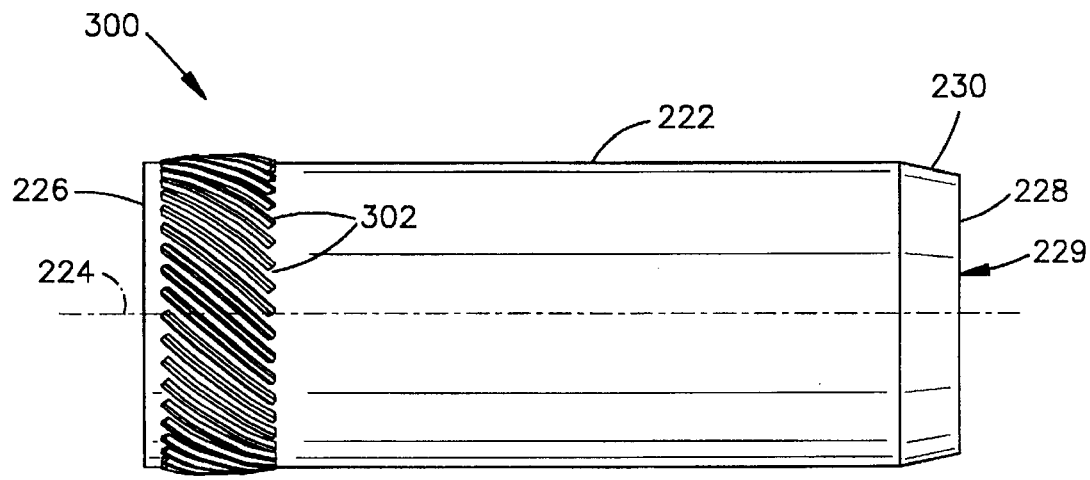
FIG. 14 is a view of a part of a second embodiment of the present invention.

In a second embodiment of the present invention, the inflator 10 includes an alternative retainer tube 300 (FIG. 14) in place of the retainer tube 220 described above. As indicated by the use of the same reference numbers in FIGS. 14 and 8, the retainer tube 300 has many parts that are substantially the same as corresponding parts of the retainer tube 220. However, the retainer tube 300 has splines 302 which differ from the splines 232 on the retainer tube 220.

Unlike the splines 232, the splines 302 are not elongated in directions parallel to the longitudinal central axis 224 of the retainer tube 300. Instead, the splines 302 are elongated along paths extending helically around the axis 224. When the retainer tube 300 is moved into the passage 190 (FIG. 7) in the closure cap 28, it is moved both circumferentially and axially relative to the axis 152 of the closure cap 28. The helical splines 302 are thus moved longitudinally against the first cylindrical inner surface 198 of the closure cap 28, and become compressively loaded radially between the first cylindrical inner surface 198 and the cylindrical outer surface 222 of the retainer tube 300. An interference fit is thus established for interlocking the retainer tube 300 with the closure cap 28 in substantially the same manner as described above with reference to the retainer tube 222.

Figure 15:
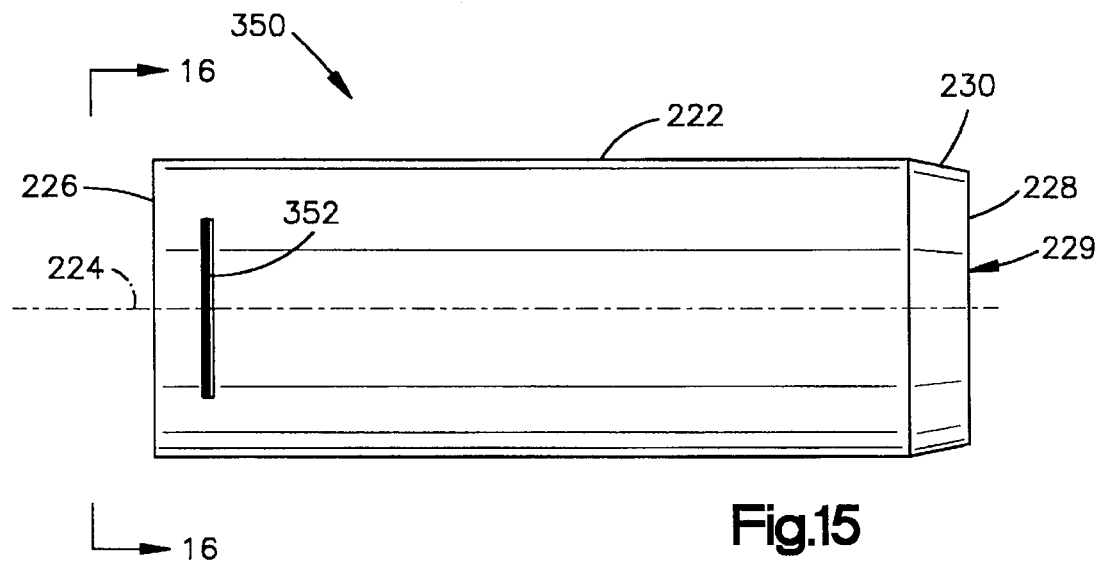
FIG. 15 is a view of a part of a third embodiment of the present invention.
Figure 16:
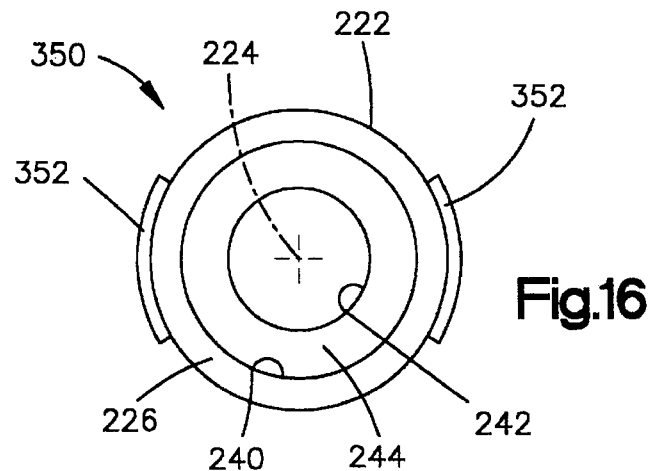
FIG. 16 is a view taken on line 16—16 of FIG. 15.

Another alternative retainer tube 350, which is shown separately in FIGS. 15 and 16, is used in the inflator 10 in a third embodiment of the present invention. Like the retainer tube 300 in the second embodiment, the retainer tube 350 in the third embodiment is substantially similar to the retainer tube 220 in the first embodiment, but has splines 352 which differ from the splines 232 on the retainer tube 220. Specifically, the retainer tube 350 has a pair of splines 352 at diametrically opposed locations. Each spline 352 is elongated along a circular path extending circumferentially around the axis 224.

The third embodiment of the present invention further includes an alternative closure cap 360, which is shown in FIGS. 17 and 18. As indicated by the use of the same reference numbers in FIGS. 17 and 7, the closure cap 360 has many parts that are substantially the same as corresponding parts of the closure cap 28 described above. The closure cap 360 further has a pair of recessed inner surfaces 362 which define a corresponding pair of circumferentially elongated notches 364. The notches 364 extend radially outward from the passage 190 at locations adjacent to the opening 179.

When the retainer tube 350 is moved axially into the passage 190 in the closure cap 360, the splines 352 are moved into the notches 364. The retainer tube 350 is then rotated about the axis 152 relative to the closure cap 360 so as to move the splines 352 longitudinally out of the notches 364 against the adjacent material of the end cap 360. Such movement of the splines 352 causes them to become compressively loaded radially, and thereby to establish an interference fit which interlocks the retainer tube 350 with the closure cap 360, in accordance with the present invention.

Figure 19:
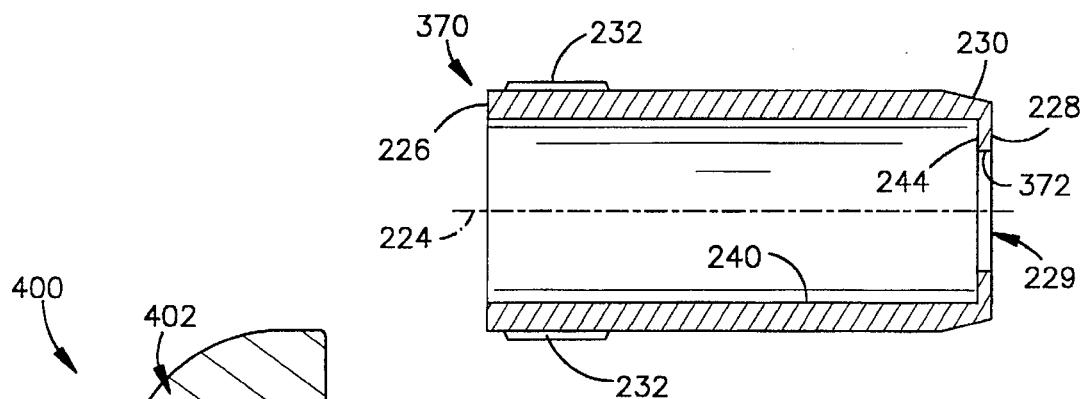
FIG. 19 is a view of a part of a fourth embodiment of the present invention.

A fourth embodiment of the present invention includes yet another alternative retainer tube 370, which is shown in FIG. 19. The retainer tube 370 of FIG. 19 also has many parts that are substantially the same as corresponding parts of the retainer tube 220 of FIG. 8, as indicated by the use of the same reference numbers in FIGS. 19 and 8. However, the retainer tube 370 has a second cylindrical inner surface 372 with a length that is substantially shorter than the length of the second cylindrical inner surface 242 of the retainer tube 220. In this configuration, the opening 229 at the axially outer end of the retainer tube 370 is closely spaced from the open end 254 (FIG. 2) of the igniter casing 38 when the retainer tube 370 and the igniter 36 are assembled together in the inflator 10.

In a fifth embodiment of the present invention, the inflator 10 of FIG. 1 includes an alternative subassembly 400 (FIG. 20) in place of the subassembly 248 (FIG. 10) described above with reference to the first embodiment. The subassembly 400 includes a closure cap 402, an igniter 404, and a retainer tube 406. Like the closure cap 28 in the subassembly 248, the closure cap 402 in the subassembly 400 has a central passage 407. Like the igniter 36 and the retainer tube 220 in the subassembly 248, the igniter 404 and the retainer tube 406 in the subassembly 400 are received in the corresponding passage 407, and are interlocked with the corresponding closure cap 402 by an interference fit where splines 408 on the retainer tube 406 engage the closure cap 402.

As known in the art, the igniter 404 has a casing 410 containing a body of pyrotechnic material (not shown) which is ignited upon the passage of electric current through the igniter 404 between a pair of electrical contact pins 412. The casing 410 has a first cylindrical portion 414, and also has a second, reduced diameter cylindrical portion 416. The first cylindrical portion 414 of the casing 410 is retained in the passage 407 axially between an annular inner surface 418 of the closure cap 402 and an opposed annular inner surface 420 of the retainer tube 406. The second cylindrical portion 416 of the casing 410 projects partially through the retainer tube 406 toward an opening 422 at the axially outer end of the retainer tube 406.

Figure 20:
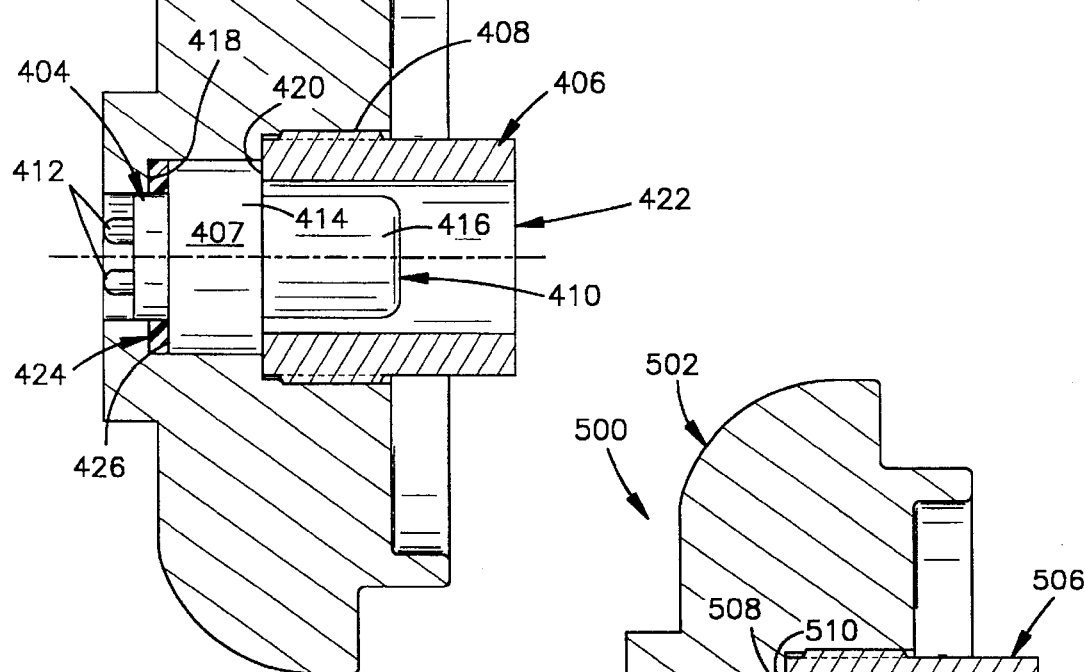
FIG. 20 is a view of a subassembly of parts of a fifth embodiment of the present invention.

As further shown in FIG. 20, an elastomeric seal 424 is compressively loaded between the igniter 404 and the closure cap 402. Specifically, the seal 424 is a ring-shaped disk which is compressively loaded axially between the annular surface 418 of the closure cap 402 and an opposed annular surface 426 on the first cylindrical portion 414 of the casing 410. The seal 424 blocks gas from leaking outward through the passage 407 in the closure cap 402 in the same manner as described above with reference to the seal 262 in the first embodiment of the present invention.

Figure 21:
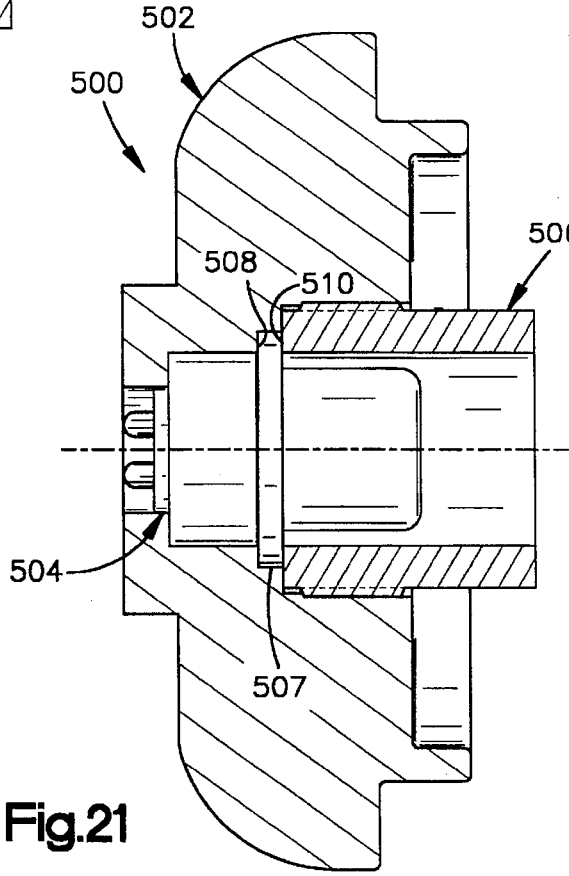
FIG. 21 is a view of a subassembly of parts of a sixth embodiment of the present invention.

As shown in FIG. 21, another alternative subassembly 500 for use in a sixth embodiment of the present invention is substantially similar to the subassembly 400 shown in FIG. 20. Like the subassembly 400, the subassembly 500 includes a closure cap 502, an igniter 504, and a retainer tube 506 interlocked with each other in accordance with the present invention. In this particular embodiment, the igniter 504 has a circular mounting flange 507 retained axially between an annular inner surface 508 of the closure cap 502 and an opposed annular end surface 510 of the retainer tube 506. The flange 507, which may be formed of either metal or plastic, is compressively loaded axially so as to establish a seal in the absence of a separate sealing part like the seal 424 shown in FIG. 20.

Figure 22:
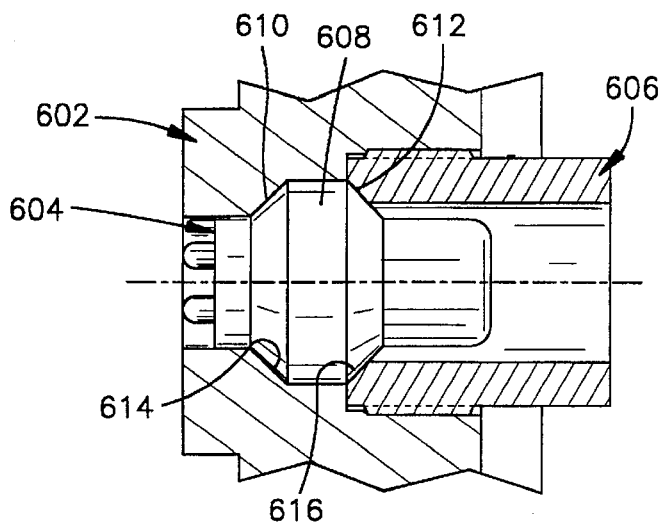
FIG. 22 is a partial view of a seventh embodiment of the present invention.

A seventh embodiment of the present invention is shown partially in FIG. 22. As shown by a comparison of FIGS. 22 and 21, the seventh embodiment is substantially similar to the sixth embodiment. The seventh embodiment thus includes a closure cap 602, an igniter 604, and a retainer tube 606 interlocked with each other in accordance with the present invention.

The igniter 604 in the seventh embodiment has a differently shaped casing 608. The casing 608 has a pair of frusto-conical outer surfaces 610 and 612 facing away from each other in axially opposite directions. The casing 608 is retained axially between an annular inner surface 614 of the closure cap 602 and an opposed annular end surface 616 of the retainer tube 606. The opposed annular surfaces 614 and 616 have frusto-conical shapes which are complementary to the shapes of the surfaces 610 and 612, respectively. The casing 608 is thus clamped firmly between the closure cap 602 and the retainer tube 606.

Figure 23:
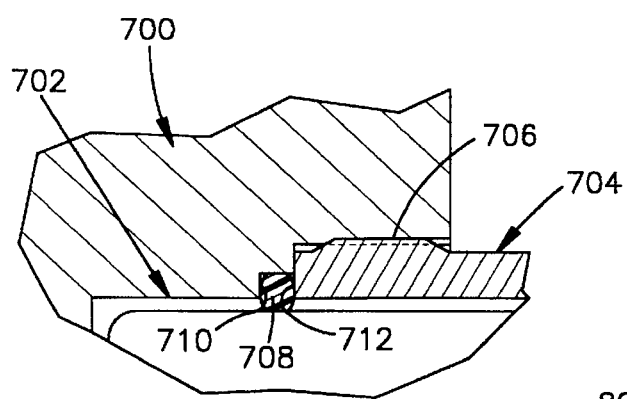
FIG. 23 is a partial view of an eighth embodiment of the present invention.

An eighth embodiment of the present invention is shown partially in FIG. 23. In the eighth embodiment, a closure cap 700, an igniter 702, and a retainer tube 704 are interlocked with each other in accordance with the present invention where splines 706 on the retainer tube 704 are engaged in an interference fit with the closure cap 700. An elastomeric O-ring seal 708 also is included in the eighth embodiment. Rather than being received in a groove in the igniter 702, the seal 708 is received fully over the igniter 702, and is retained axially between an annular inner surface 710 of the closure cap 700 and an opposed annular end surface 712 of the retainer tube 704.

In a ninth embodiment of the present invention, a subassembly 800 (FIG. 24) is used in the inflator 10 of FIG. 1 in place of the subassembly 248 (FIG. 10). In the subassembly 800, an igniter 802 and a retainer tube 804 are interlocked with a closure cap 806. A casing portion 808 of the igniter 802 is contained in a passage 810 in the closure cap 806. The casing portion 808 is retained axially between an annular inner surface 812 of the closure cap 806 and an opposed annular end surface 814 of the retainer tube 804. The retainer tube 804 is received in an installed position extending axially in the passage 810, and cooperates with the closure cap 806 to interlock the igniter 802, the retainer tube 804, and the closure cap 806 with each other in accordance with the present invention.

Figure 24:
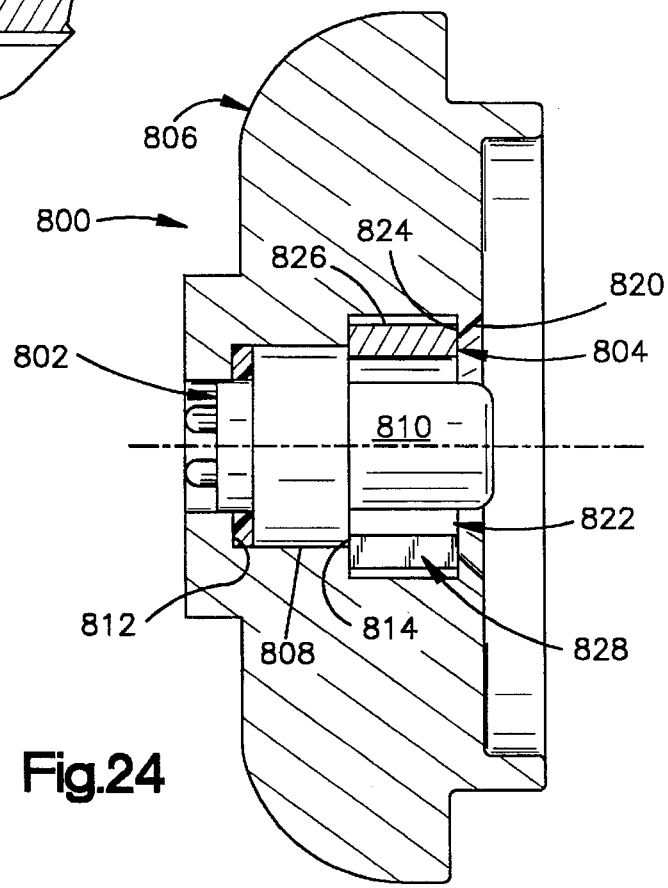
FIG. 24 is a view of a subassembly of parts of a ninth embodiment of the present invention.

Specifically, the retainer tube 804 is moved to its installed position by first moving the annular end surface 814 axially against a frusto-conical annular edge surface 820 of the closure cap 806. The edge surface 820 of the closure cap 806 defines a circular opening 822 through which the retainer tube 804 is movable into the passage 810, and is located on a rim portion 824 of the closure cap 806 which surrounds the opening 822. A cylindrical outer surface 826 of the retainer tube 804 has a diameter which is just slightly greater than the diameter of the edge surface 820 at the opening 822. Therefore, the retainer tube 804 is contracted diametrically across the opening 822 when the annular end surface 814 of the retainer tube 804 is pressed against the edge surface 820 upon movement of the retainer tube 804 axially inward through the opening 822. A slot 828 extending radially through the retainer tube 804 enables it to be contracted in this manner. When the retainer tube 804 has been moved fully into the passage 810 to the installed position in which it is shown in FIG. 24, it resiliently extends itself diametrically outward past the opening 822. The rim portion 824 of the closure cap 806 then blocks movement of the retainer tube 804 axially outward from the passage 810. The retainer tube 804 is thus snapped into a mechanical interlock with the closure cap 806. Although the retainer tube 804 preferably includes the slot 828, it could alternatively be constructed as a thin walled metal tube, or as a plastic tube, so as be flexible enough to contract and extend without the use of a slot.

Figure 25:
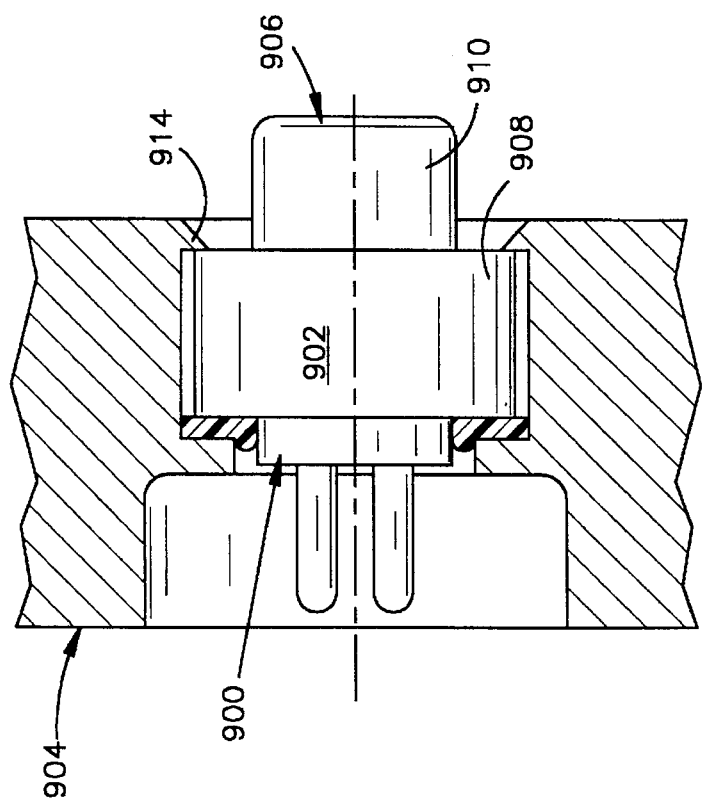
FIG. 25 is a partial view of a tenth embodiment of the present invention.

A tenth embodiment of the present invention is shown partially in FIG. 25. The tenth embodiment is similar to the ninth embodiment, and includes an igniter 900 received in a passage 902 in a closure cap 904. The igniter 900 has a tubular cylindrical casing 906 with an axially inner section 908 and a reduced diameter, axially outer section 910. In accordance with the present invention, the casing 906 is mechanically interlocked with the closure cap 904 as a result of movement of the inner section 908 of the casing 906 axially past a rim 914 of the closure cap 904 in the same manner as described above with reference to the retainer tube 804 and the rim 824 shown in FIG. 24. The resilient structure of the casing 906 allows the inner section 908 to contract diametrically, and subsequently to extend diametrically, upon such movement of the inner section 908 past the rim 914.

Figure 26:
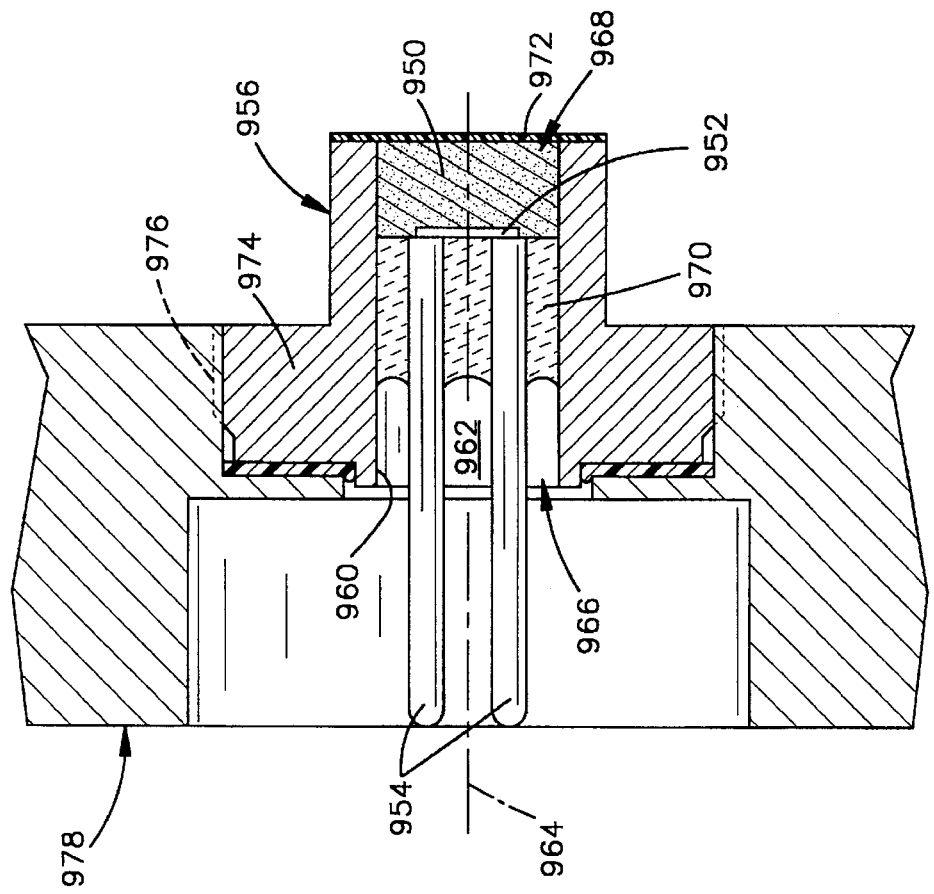
FIG. 26 is a partial view of an eleventh embodiment of the present invention.

An eleventh embodiment of the present invention is shown partially in FIG. 26. Like each embodiment described above, the eleventh embodiment includes a body 950 of ignitable pyrotechnic material like the body 48 of pyrotechnic material shown schematically in FIG. 3. Like the bridgewire 46 described above, a bridgewire 952 adjoins the body 950 of pyrotechnic material so as to ignite the body 950 when resistively heated by the passage of electric current between a corresponding pair of contact pins 954. However, the body 950 of pyrotechnic material is not contained in a casing like the casing 38. Instead, the body 950 of pyrotechnic material is contained in a relatively rigid, nonrupturable tubular structure 956.

A cylindrical inner surface 960 of the tubular structure 956 defines a passage 962 extending through the tubular structure 956 along a central axis 964. The passage 962 has first and second ends 966 and 968. The body 950 of pyrotechnic material is enclosed within the passage 962 by a glass seal 970 and a rupturable closure structure 972. The seal 970 supports the contact pins 954 in positions spaced from each other and from the surrounding cylindrical inner surface 960. As known in the art, the seal 970 is bonded to the adjoining surfaces of the contact pins 954, and to the adjoining portion of the cylindrical inner surface 960, so as to provide a hermetic seal between the body 950 of pyrotechnic material and the first end 966 of the passage 962. The closure structure 972 extends across the second end 968 of the passage 962, and is fixed to the tubular structure 956 in a known manner so as to provide a hermetic seal at the second end 968 of the passage 962.

As further shown in FIG. 26, the tubular structure 956 has a diametrically enlarged inner end portion 974 with a plurality of radially projecting splines 976. The splines 976 are engaged with a surrounding closure cap 978 in the same manner that the splines in the other embodiments of the present invention are engaged with the corresponding closure caps. The tubular structure 956 is thus interlocked with the closure cap 978 by an interference fit between the tubular structure 956 and the closure cap 978.

From the above description of the invention, those skilled in the art will perceive improvements, changes and modifications. For example, the sizes, shapes, and number of splines in each embodiment of the present invention could differ from those described above. Some or all of the splines could be located on the closure caps rather than on the retainer tubes. Such improvements, changes and modifications within the skill of the art are intended to be covered by the appended claims.

Having described the invention, the following is claimed:

1. Apparatus comprising:

a housing containing a body of ignitable gas generating material;

a closure cap at one end of said housing, said closure cap having inner surfaces defining a passage centered on an axis, said inner surfaces including a first annular surface;

a cylindrical retainer tube in an installed position extending axially in said passage, said retainer tube having a second annular surface facing axially toward said first annular surface; and an igniter having a cylindrical casing extending in said passage coaxially within said retainer tube, said casing being retained axially between said first and second annular surfaces;

said retainer tube and said closure cap together comprising locking means for interlocking said retainer tube with said closure cap as a result of movement of said retainer tube to said installed position in said passage.

2. Apparatus as defined in claim 1 wherein said second annular surface is an inner surface of said retainer tube.

3. Apparatus as defined in claim 1 wherein said second annular surface is an end surface of said retainer tube.

4. Apparatus as defined in claim 1 wherein said closure cap has a cylindrical inner surface surrounding a cylindrical outer surface of said retainer tube, said locking means comprising a plurality of splines which are compressively loaded radially between said cylindrical surfaces so as to establish an interference fit between said closure cap and said retainer tube.

5. Apparatus as defined in claim 4 wherein said splines are portions of said retainer tube which project radially toward said closure cap.

6. Apparatus as defined in claim 4 wherein said splines are elongated in directions parallel to said axis.

7. Apparatus as defined in claim 4 wherein said splines are elongated along paths extending helically around said axis.

8. Apparatus as defined in claim 4 wherein said splines are elongated along circular paths extending circumferentially around said axis, said inner surfaces of said closure cap defining circumferentially extending notches for receiving said splines upon movement of said retainer tube axially into said passage.

9. Apparatus as defined in claim 1 wherein said locking means snaps into a locked condition to establish a mechanical interlock between said retainer tube and said closure cap upon said movement of said retainer tube to said installed position in said passage.

10. Apparatus as defined in claim 1 further comprising an elastomeric seal compressively loaded between said casing and said closure cap.

11. Apparatus as defined in claim 10 wherein said seal is a ring-shaped disk compressively loaded axially between said casing and said first annular surface of said closure cap.

12. Apparatus as defined in claim 10 wherein said seal is compressively loaded axially between an annular surface of said closure cap and an opposed annular surface of said retainer tube.

13. Apparatus as defined in claim 12 wherein said opposed annular surface of said retainer tube is an end surface of said retainer tube.

14. Apparatus comprising:

a housing containing a body of ignitable gas generating material;

a body of pyrotechnic material;

electrically conductive means for igniting said body of pyrotechnic material;

closure means for closing said housing, said closure means having a passage extending through said closure means along an axis; and tubular means for directing combustion products from said body of pyrotechnic material toward said body of gas generating material, said tubular means having an installed position extending axially in said passage;

said tubular means and said closure means together comprising locking means for interlocking said tubular means with said closure means so as to block removal of said tubular means from said installed position in said passage, said locking means deflecting into a locked condition upon movement of said tubular means to said installed position in said passage;

said closure means having a cylindrical inner surface surrounding a cylindrical outer surface of said tubular means, said locking means comprising a plurality of splines which are compressively loaded radially between said cylindrical surfaces so as to establish an interference fit between said tubular means and said closure means.

15. Apparatus as defined in claim 14 wherein said splines are portions of said tubular means which project radially outward toward said closure means.

16. Apparatus as defined in claim 14 wherein said splines are elongated in directions parallel to said axis.

17. Apparatus as defined in claim 14 wherein said splines are elongated along paths extending helically around said axis.

18. Apparatus as defined in claim 14 wherein said splines are elongated along circular paths extending circumferentially around said axis, said surface of said closure means defining circumferentially elongated notches for receiving said splines upon movement of said tubular means axially into said passage.

* * * * *